US010430921B1

(12) United States Patent
Brebner

(10) Patent No.: US 10,430,921 B1
(45) Date of Patent: Oct. 1, 2019

(54) MULTI-USER APPLICATION SYSTEM ENVIRONMENT ENGINE

(71) Applicant: Umajin Inc., Woburn, MA (US)

(72) Inventor: David Brebner, Palmerston North (NZ)

(73) Assignee: Umajin Inc., Woburn, MA (US)

( * ) Notice: Subject to any disclaimer, the term of this patent is extended or adjusted under 35 U.S.C. 154(b) by 0 days.

(21) Appl. No.: 16/279,094

(22) Filed: Feb. 19, 2019

(51) Int. Cl.
*G06T 15/00* (2011.01)
*G06F 17/50* (2006.01)
*G06T 3/00* (2006.01)
*G06F 9/448* (2018.01)
*G06F 9/48* (2006.01)

(52) U.S. Cl.
CPC .......... *G06T 3/0037* (2013.01); *G06F 9/4482* (2018.02); *G06F 9/4881* (2013.01); *G06F 17/5009* (2013.01); *G06T 15/005* (2013.01); *G06F 2209/548* (2013.01)

(58) Field of Classification Search
CPC ... G06T 3/0037; G06T 15/005; G06F 9/4482; G06F 9/4881; G06F 17/5009; G06F 2209/548
See application file for complete search history.

(56) References Cited

U.S. PATENT DOCUMENTS

| 2005/0231514 A1* | 10/2005 | Harper | G06T 1/20 345/501 |
| 2011/0161924 A1 | 6/2011 | Alexander et al. | |
| 2014/0223413 A1 | 8/2014 | Ge | |
| 2018/0018148 A1 | 1/2018 | Brebner | |
| 2019/0004791 A1 | 1/2019 | Brebner | |
| 2019/0102370 A1* | 4/2019 | Nelson | G06F 17/2288 |
| 2019/0121874 A1* | 4/2019 | Vilim | G06F 16/168 |

OTHER PUBLICATIONS

Hedquist, Ulrika, Creative software could change way computers are used, https://www.computerworld.co.nz/article/498679/creative_software_could_change_way_computers_used/ Jun. 5, 2007, 2 pages.
Brebner, David, Umajin Script Introduction, http://www.davidbrebner.com/?p=4, Sep. 1, 2013, 9 pages.
Brebner, David, Umajin History, www.davidbrebner.com_page_id=437, 2018, 3 pages.
Code2flow—online interactive code to flowchart converter, https://code2flow.com/, 8 pages, printed Apr. 1, 2019.
Ask Slashdot: Is There a Way to Write Working Code by Drawing Flow Charts?, https://ask.slashdot.org/story/17/06/03/0113239/ask-slashdot-is-there-a-way-to-write-working-code-by-drawing-flow-charts; Jun. 4, 2017, 31 pages.

* cited by examiner

*Primary Examiner* — Grace Q Li
(74) *Attorney, Agent, or Firm* — Sunstein Kann Murphy & Timbers LLP

(57) ABSTRACT

A multi-user application system environment engine has an application system that, in turn, includes a simulation engine and a virtualized software environment. The simulation engine runs on top of the virtualized software environment and includes a declaration processor, a scene tree object manager, a persistence processor in communication with the scene tree object manager, a visual editor, an editor broadcaster, an editor listener, and a rendering processor, coupled to the virtualized software environment, to requisition hardware resources to cause physical manifestation of an instantiated scene tree of objects.

20 Claims, 12 Drawing Sheets

Local User

MULTI-USER APPLICATION SYSTEM ENVIRONMENT ENGINE

RELATED APPLICATION

The present application has subject matter related to an international application under the Patent Cooperation Treaty having international publication number WO2016/063022. That related application, for an invention by the same inventor as for the present application, is hereby incorporated herein by reference in its entirety.

TECHNICAL FIELD

The present invention relates to application systems, and more particularly to application systems in a multi-user environment.

SUMMARY OF THE EMBODIMENTS

Embodiments of the present invention provide an environment that differs from prior art computer-focused environments requiring tools, modules and programming languages as conditions for causing computer execution of programs. Embodiments of the present invention provide an environment in which computer processes are made subservient to a human-oriented set of requirements and goals. The requirements and goals are specified at a high level by the user in a manner independent of the hardware, operating system and software libraries, and it is then up to the computer software to work out how to meet these requirements and goals. In embodiments of the present invention, the requirements and goals are specified by the user in a new layer, which we call an "application system," wherein the interaction is accomplished using s simulation engine. The simulation engine can exploit many pre-compiled highly efficient subsystems with lazy evaluation, domain specific heuristics and machine learning to achieve the goals extremely efficiently. Importantly, unlike normal software, which requires just in time or static compilation before it is run, the application system provides, in its user interface, what we call "declarations," which can be updated live while they are being simulated.

In accordance with one embodiment of the invention, a multi-user application system environment engine has an application system that, in turn, includes a simulation engine and a virtualized software environment. The simulation engine runs on top of the virtualized software environment and includes a declaration processor, a scene tree object manager, a persistence processor in communication with the scene tree object manager, a visual editor, an editor broadcaster, an editor listener, and a rendering processor, coupled to the virtualized software environment, to requisition hardware resources to cause physical manifestation of an instantiated scene tree of objects.

More particularly, in one embodiment, there is provided a nontransitory storage medium encoded with instructions, for use with a plurality of computer systems, each one of which is in communication in real time over a network with the other computer systems, wherein the instructions, when executed on each of the computer systems, establish, on each computer system, an application system. The application system includes a simulation engine and a virtualized software environment, and the simulation engine runs on top of the virtualized software environment and enables creation and editing of a project by a local user and network users. In this embodiment, the simulation engine includes a declaration processor that linearly processes a first declaration that constitutes a text embodiment of the project, reciting any set of items selected from the group consisting of object, relationship, property, behavior, and combinations thereof, into a declared scene tree of objects.

The application system of this embodiment additionally includes a scene tree object manager that (a) manages objects, their relationships, properties, and behaviors in a declared scene tree of objects, (b) causes transformation of the declared scene tree of objects so as to be mirrored in a project subnode of an instantiated scene tree of objects, the project subnode constituting an instantiated embodiment of the project, and (c) causes updating of the instantiated scene tree when it is changed.

The application system of this embodiment additionally includes a persistence processor in communication with the scene tree object manager, that causes mirroring, of the instantiated scene tree of objects, in a second declaration. The application system further includes a visual editor, the visual editor being a subnode of the instantiated scene tree, that makes user-directed changes to the project subnode of the instantiated scene tree, wherein the project subnode is a subnode of the visual editor.

Furthermore, the application system of this embodiment includes an editor broadcaster and an editor listener. The editor broadcaster is a subnode of the instantiated scene tree, coupled to the network, that obtains changes from the visual editor and causes the persistence processor to transform a correspondingly changed part of the instantiated scene tree into a change declaration and broadcasts the change declaration embedded in a change message over the network to the other computer systems. The editor listener is a subnode of the instantiated scene tree, coupled to the network, that receives and processes any change message, from any other of the computer systems, by causing the declaration processor to transform a declaration embedded in received change message into a corresponding change in the instantiated scene tree.

Finally, the application system of this embodiment includes a rendering processor. The rendering processor is coupled to the virtualized software environment, to requisition hardware resources to cause physical manifestation of the instantiated scene tree of objects in a form selected from the group consisting of audio, visual, network communication, storage in a transitory or a nontransitory basis, computational tasks, and combinations thereof, the physical manifestation being optimized by evaluation of hardware resources that are both available and required to be allocated in order to achieve the physical manifestation.

In a related embodiment, the editor has a mode wherein it operates solely as a viewer and does not communicate with the editor broadcaster or the persistence processor. Alternatively or in addition, the visual editor maintains a globally unique identifier for each object in the instantiated scene tree, so that each change, made over the network, can use the identifier to reference the corresponding object and that such change can be correctly applied to the instantiated scene tree. Also alternatively or in addition, the visual editor associates, with each change made by a user over the network, an identification of the user making the change and a time stamp. Also alternatively or in addition, the visual editor characterizes each change, made over the network, to the instantiated scene tree, as a member of the group consisting of insertion, deletion, update, lock, unlock, and combinations thereof. Also alternatively or in addition, each of the computer systems is coupled over the network to a server system, and the editor broadcaster also broadcasts the change declaration embedded in the change message over the network to the server system for storage thereof in a declaration repository. Also alternatively or in addition, the simulation engine further includes a frame clock defining consecutive frames of the engine with respect to which operations are synchronized.

In another related embodiment, the simulation engine further includes a frame processor, coupled to the virtualized software environment and to the simulation engine, to require the simulation engine to perform operations, specified with respect to a sequence of frames using the frame clock, to assure that the processes are performed sequentially. Optionally, (a) the simulation engine further comprises a frame queue, filled by the simulation engine, in which are stored, in frame order, software contracts pertinent to processes to be carried out by the simulation engine, and (b) the frame processor is coupled to the frame queue and, if a specific software contract in the frame queue reaches a current frame for performance, the frame processor enforces the terms of the specific software contract as to best efforts and guaranteed terms. In a further related embodiment, the frame processor is configured to process, concurrently with the current frame, a set of frames sequenced after the current frame, with respect to demand expected to be placed on system resources by the specific software contract, so as to enhance efficiency of execution of the contract when each frame in the set of frames shall have become the current frame. As a further option, in the processing of an event, via the frame processor, from the virtualized software environment, the simulation engine executes logic creating a temporal assignment, which is added to the frame queue based on a frame number computed, based on a current frame number and a target time, in frame order by object and property, so that if the computed frame number is less than a frame number of any second item in the frame queue, then the second item will be flushed from the queue. Also optionally, at the time of creating the temporal assignment the frame processor stores an initial set of values and the initial time along with a target set of values and a target time, and an interpolation function, when a frame needs to be computed, the frame processor computes a set of current values using the current time, the initial time and the target time to drive the interpolation function between the initial values and target values.

In a further related embodiment, the frame processor operates on a best efforts basis to cause updating of the interactive scene tree and visual scene tree so as to correspond with the calculated set of values until the final frame has been reached, at which time the frame processor causes the temporal assignment to be contractually updated throughout the system. As a further option, in the processing of an event, via the frame processor, from the virtualized environment, the simulation engine executes logic creating a temporal procedure, which is added to the frame queue at a frame number computed, based on a current frame number and a target time, in frame order by object and property, so that if the computed frame number is less than a frame number of any second item in the frame queue, then the second item will be flushed from the queue.

In another related embodiment, the first declaration conforms to a declaration grammar wherein:
  a loop is not permitted;
  a branching condition is not permitted;
  a procedure with a set of parameters is permitted; and
  an object in a declared scene tree is permitted to have a set of states, wherein:
    each state must be separately selected from a group consisting of (a) a state that is a set of nested states and (b) a state that is nonoverlapping with any other state; and
    each state can encompass a set of properties, a set of events, and a set of sub-objects; and
    a given state can only be active or inactive; and
    active states in a declaration are applied, by the scene tree manager, in the order in which they are declared.

Optionally in the immediately preceding related embodiment, the permitted procedure with the set of parameters includes a procedure call to a procedural function in a scripting language.

In another related embodiment, the scene tree is configured to cause the second declaration is to replace the first declaration. Alternatively or in addition, the simulation engine includes a library of classes that implement an abstraction of a set of operating systems. Alternatively or in addition, the editor listener of any given client includes an off-line synchronizer coupled to a repository server system, the repository server system having a declaration repository that stores a log of each change made in any declaration by any user on the network to any scene tree accessible over the network, so that, when the given client comes online after having been offline, the off-line synchronizer communicates with the declaration repository to synchronize changes that were not synchronized when the given client had been offline.

In another embodiment, the invention provides a nontransitory storage medium encoded with replicating instructions, for use on a computer configured as a replicating computer in the computer environment described with respect to the previous embodiments, the replicating instructions, when executed on the replicating computer, establish, on the replicating computer, a replicating application system, wherein the replicating application system includes a replicating simulation engine and a replicating virtualized software environment, the replicating simulation engine running on top of the replicating virtualized software environment. In this embodiment, the replicating simulation engine comprises: a replicator declaration processor that linearly processes a first declaration that constitutes a text embodiment of the project, reciting any set of items selected from the group consisting of object, relationship, property, behavior, and combinations thereof, into a declared scene tree of objects; a replicator scene tree object manager that (a) manages objects, their relationships, properties, and behaviors in a declared scene tree of objects, (b) causes transformation of the declared scene tree of objects so as to be mirrored in a project subnode of an instantiated scene tree of objects, the project subnode constituting an instantiated embodiment of the project, and (c) causes updating of the instantiated scene tree when it is changed; a replicator editor, that makes user-directed changes to the project subnode of the instantiated scene tree, wherein the project subnode is a subnode of the visual editor; and a replicator listener, coupled to the network, that receives and processes any change message, from any other of the computer systems, by causing the declaration processor to transform a declaration embedded in received change message into a corresponding change in the instantiated scene tree.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
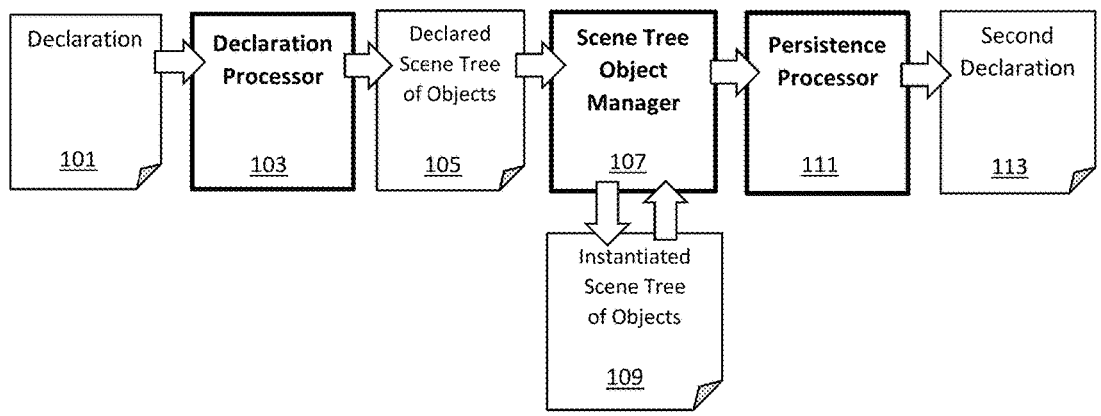
FIG. 1 is a flow diagram showing logical processes carried out by a simulation engine in accordance with an embodiment of the present invention to transform a declaration into objects in a scene tree manager, wherein thereafter such objects can be transformed into a second declaration.

Definitions. As used in this description and the accompanying claims, the following terms shall have the meanings indicated, unless the context otherwise requires:

A "set" has at least one member.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

An "operating system" is an environment of a host computer system, which may be a conventional operating system, but alternatively may be any computing environment that can cause execution of computer instructions, receive input and provide output, including, for example, a web browser, a Java runtime environment, a Microsoft common language runtime environment, etc.

A "cloud infrastructure" is an environment supporting input and output over a network and by which there is caused execution of computer instructions over the network.

A "virtualized" software environment is an environment by providing a layer of abstraction on top of a specific operating system or a specific cloud infrastructure, so that interaction with the virtualized software environment is independent of the specific operating system or the specific cloud infrastructure.

An "application system" is a system selected from the group consisting of (i) a virtualized software system that is configurable to exist on top of any desired operating system and (ii) a virtualized cloud infrastructure that is configured to exist on top of any desired cloud infrastructure and (iii) combinations thereof. A "simulation engine" is a software functionality, in the portion of the application system that runs on top the A "frame clock" is a timing mechanism defining successive frames with respect to which operations of the simulation engine are synchronized.

A first computer system is in communication "in real time" over a network with a second computer system, when information is exchanged bidirectionally between the computer systems according to scheduling determined by the first and second computer systems and without dependency on polling.

A "declared scene tree" is a hierarchical map of objects and their relationships, properties, and behaviors, defined by a declaration, and that are capable of being instantiated.

hierarchical characterization of objects and their relationships, properties, and behaviors in an instantiation of a declaration. In any given "instantiated scene tree" (also sometimes called a "scene graph") is an abstract computing device, however, the instantiated scene tree is rendered, if at all, only in accordance with the virtualized software environment of the given computer device. Accordingly, when the given computing device is a replication computer, there is no rendering of the instantiated scene tree at all.

A "visible scene tree" is a representation of objects, and their relationships, properties, and behaviors, in a corresponding scene tree, that are simultaneously visible in a display.

An "interactive scene tree" is a representation of objects, and their relationships, properties, and behaviors, in a corresponding scene tree, that are simultaneously available for user interaction in a display.

A "temporal assignment" is the specifying, effective at an initial time, of (i) a set of target values for a corresponding set of variables, (ii) a target time at which the target set of values is to be achieved, and (iii) and a time-varying function by which the target set of values is to be achieved. The time-varying function is operative over successive frame counts to transform the initial set of values at the initial time to the target set of values at the target time, using the ratio of the (a) amount of time remaining to reach the target time to (b) to the difference between the target time and the initial time.

An "temporal procedure" is the specifying, effective immediately, of (i) a procedure and a set of parameters for the procedure, (ii) a target time at which the procedure will be invoked, and (iii) optionally, a number of times over which the procedure will be repeated.

A computer process defined by a temporal assignment or by a temporal procedure is subject to a "software contract" when configured by the assignment to carry out the process under conditions selected from the group consisting of best efforts, guaranteed, and combinations thereof.

A "best efforts" software contract associated with a computer process is when the process is carried out on a frame-by-frame basis, wherein, if tasks defined for a given frame cannot be carried out, then processing moves to tasks associated with the next frame even if the defined tasks have not been carried out.

A "guaranteed" software contract associated with a computer process is when the process is carried out on an absolute basis wherein tasks associated with a target frame must be carried out before proceeding to tasks associated with a succeeding frame.

"Linear logic" is a set of procedures that can be executed strictly from left to right, or top to bottom, without looping or branching, and that can be defined with zero, one, or more parameters.

An "declaration respository" of a repository server system in a multiuser network is a shared storage facility in which is stored a log of each change made in any declaration by any user on the network to any scene tree accessible over the network and which communicates with an off-line synchronizer of each client to provide, to such client, any changes on the stored log that had not been synchronized when such client had been offline.

FIG. 1 is a flow diagram showing logical processes carried out by a simulation engine in accordance with an embodiment of the present invention to transform a declaration into objects in a scene tree object manager, wherein thereafter such objects can be transformed into a second declaration. In this respect, the processes are "mirroring" processes, by causing the declaration to be mirrored in objects in the scene tree object manager and those objects in turn to be mirrored in a second declaration. These processes begin with an input 101, which is a declaration, namely a text-based representation of a set of objects. Embodiments of the present invention require a declaration to conform to a specific grammar, described below, that facilitates processing of the declaration. The declaration input 101 is provided to a declaration processor 103 that uses the declaration to create an abstract data structure 105 that we term a "declared scene tree of objects." The declared scene tree of objects 105 includes abstract representations of objects such as classes and is used by the scene tree object manager 107 to create an instantiated scene tree 109 of fully specified objects.

It can be seen that from the previous paragraph that a declaration can define an instantiated scene tree of objects. Additionally, when there is an instantiated scene tree of objects, in embodiments of the present invention, it is also possible to create a second declaration. Therefore, in accordance with processes carried out in embodiments of the present invention, the persistence processor 111 transforms some or all objects in the instantiated scene tree of objects 109 into a second declaration 113. Accordingly, it can be seen that in embodiments of the present invention that a declaration is mirrored in an instantiated scene tree of objects, and that the declaration and instantiated scene tree have a direct correspondence with one another.

Although a declaration may give rise to a complete instantiated scene tree of objects as just described, it is an aspect of embodiments of the invention to use a partial declaration to characterize partial aspects of an instantiated scene tree. In this way, one or more partial declarations can modify an instantiated scene tree in whole or in part, and vice versa: a partial aspect of an instantiated scene tree can be used to establish a second declaration corresponding to the partial aspect.

Figure 2:
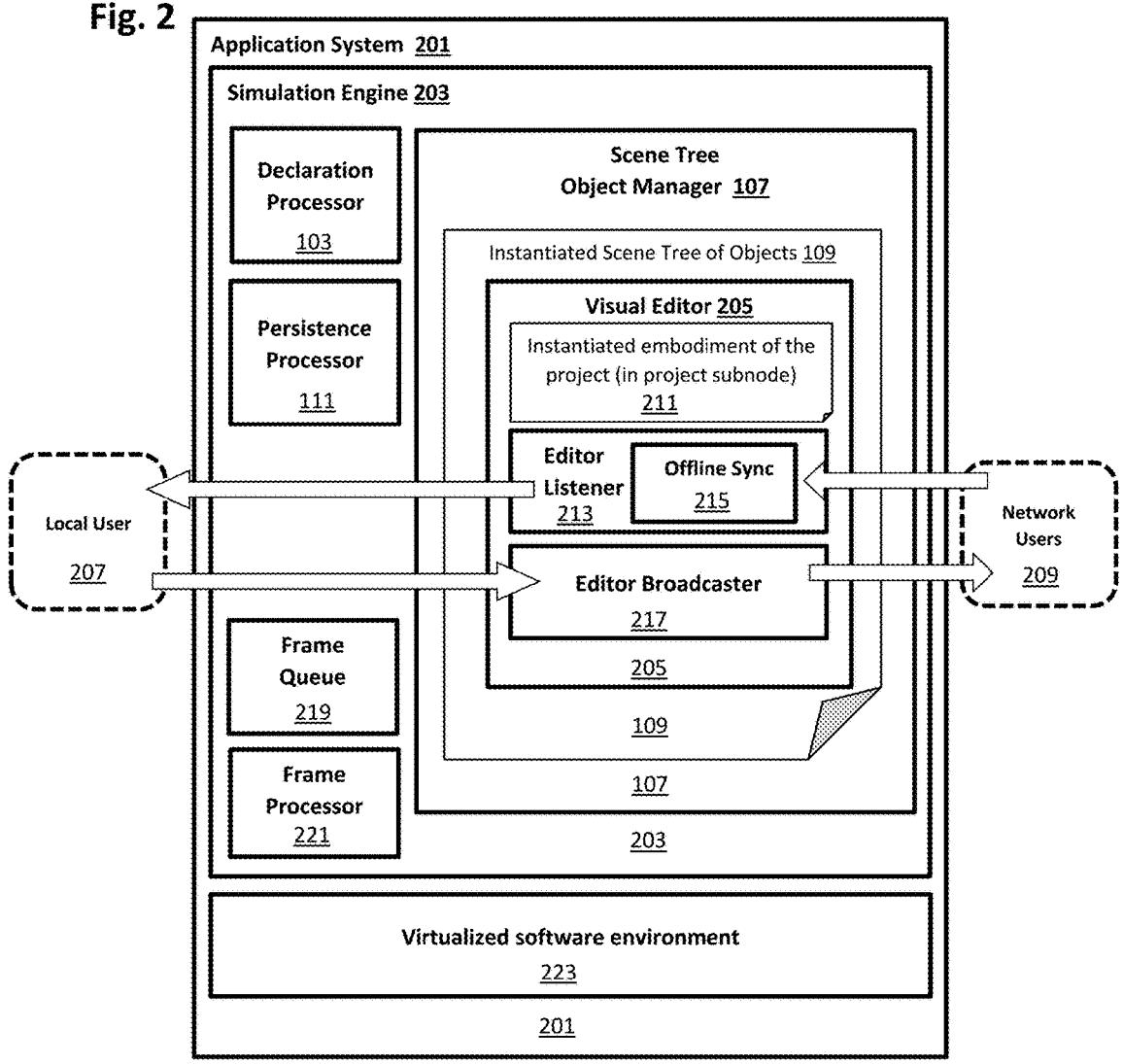
FIG. 2 is a block diagram of an embodiment of the present invention, in which an application system in a multiuser environment contains a simulation engine that, in turn, contains a scene tree object manager that is hosting, in this example, a visual editor.

FIG. 2 is a block diagram of an embodiment of the present invention, in which an application system 201 in a multiuser environment contains a simulation engine 203 that, in turn, contains a scene tree object manager 107 that is hosting, in this example, a visual editor 205.

The Application System 201 interfaces with the Network Users 209 and presents the application to the Local User 207. The Application System 201 contains a Simulation Engine 203, which is responsible for the application behavior, a Frame Processor 221 to keep the simulation in synchronization with the application behavior, visual rendering and the other users and a Virtualized software environment 223, which abstracts a selected operating system or operating environments for use with the Application System 201.

The Simulation engine 203 is responsible for the majority of work in delivering the application behavior. The Simulation Engine 203 contains a Declaration processor 103 and a persistence processor 111 responsible for converting objects in the scene tree to and from declarations. The Simulation Engine 203 also contains a Frame Queue 219, to store software contracts required by the simulation, and a Scene Tree Object Manager 107, which manages all of the objects in the application.

The Scene Tree Object Manager 107 also contains an Instantiated Scene Tree of Objects 109. These Objects exist in the running application. The application is manifested to the local user 207 through the Visual Editor 205. The Visual Editor 205 in turn contains an Instantiated Embodiment 211 of a project. The Visual Editor 205 also contains an Editor Listener 213, to listen for network traffic and to make corresponding changes to the instantiated scene tree of objects 109, and an Offline Sync 215 feature, to download changes made by other Network Users 209 when the local user 207 has been offline. The Visual Editor 205 also contains an Editor Broadcaster 217 to share, with the other Network Users 209, any changes made by the Local User 207.

Figure 3:
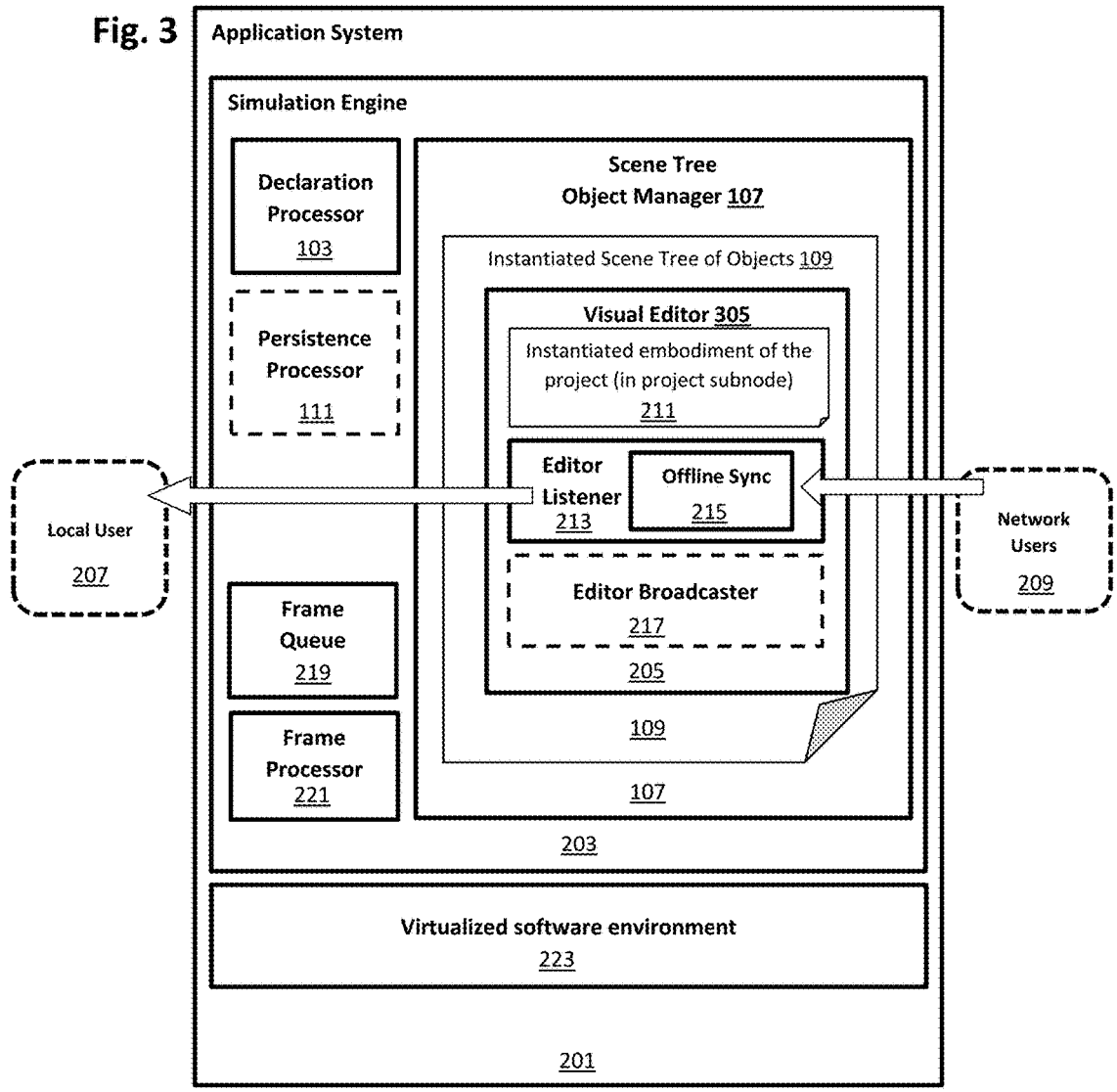
FIG. 3 is a block diagram of an embodiment of the present invention, in which an application system in a multiuser environment contains a simulation engine that, in turn, contains a scene tree object manager that is hosting, in this example, a viewer.

FIG. 3 is a block diagram, similar to that of FIG. 2, of an embodiment of the present invention, in which an application system in a multiuser environment contains a simulation engine that, in turn, contains a scene tree object manager that is hosting, in this example, a viewer, which is achieved by using the Visual Editor 305 in a read-only mode.

The Visual Editor 305 in FIG. 3 is similar to the Visual Editor 205 of FIG. 2, but differs from the Visual Editor 205 in FIG. 2 in not using the Persistence Processor 111 and Editor Broadcaster 217, which are shown in dashed outline in FIG. 3. Because the Visual Editor 305, serving only as a viewer, is incapable of making edits to the instantiated scene tree of objects 109, there are no edits of the local user 207 to broadcast. Only instantiating a cached project or incoming updates from the Network Users 209 are required for operation of the Visual Editor 305 as a viewer. All of the other elements required for the correct simulation of the project are the same as in FIG. 2.

Figure 4:
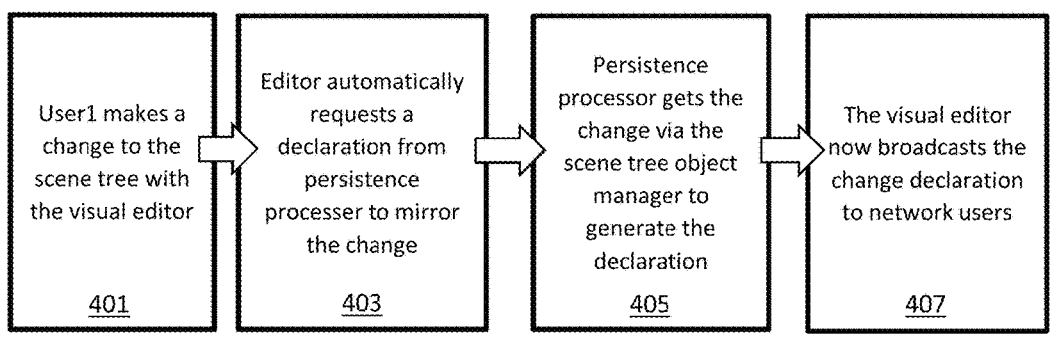
FIG. 4 is flow diagram showing logical processes, responsive to a change in a scene tree, made by a first user in a multiuser environment, using a visual editor, for propagating the change to other users in the network in accordance with an embodiment of the present invention.

FIG. 4 is flow diagram showing logical processes, responsive to a change in a scene tree, made by a first user in a multiuser environment, using a visual editor, such as Visual Editor 205 of FIG. 2, for propagating the change to other users in the network in accordance with an embodiment of the present invention. In FIG. 4, in process 401, user1 uses the Visual Editor 205 to make a change to the instantiated scene tree of objects 109. In process 403, the Visual Editor 205 automatically requests a declaration from the persistence processor 111 for mirroring the change made by the first user. In process 405, the persistence processor 111 gets the change from the Scene Tree Object Manager 107 and generates the declaration. In process 407, the Visual Editor 205 now uses the Editor Broadcaster 217 to send the declaration to other Network Users 209 as a broadcast.

Figure 5:
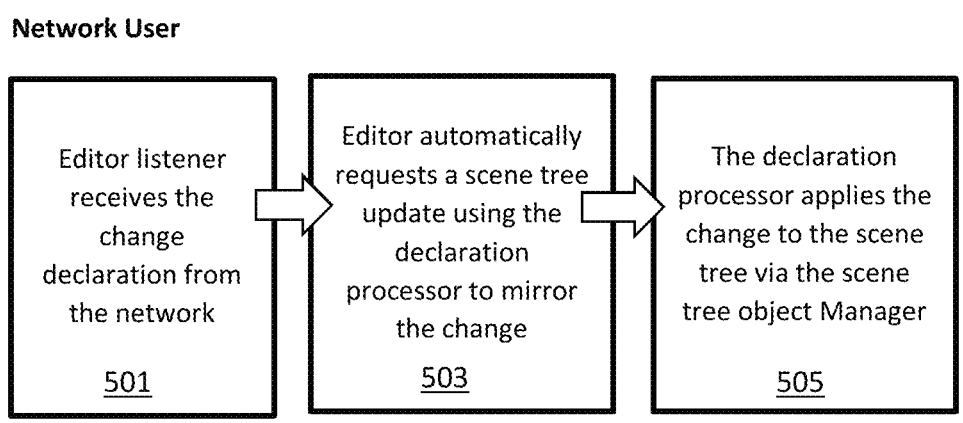
FIG. 5 is flow diagram showing logical processes by which a change, made by a first user in a multiuser environment, is propagated over the network and applied to a local scene tree experienced by a second user in accordance with an embodiment of the present invention.

FIG. 5 is flow diagram showing logical processes by which a change, made by a first user in a multiuser environment, using a visual editor, such as Visual Editor 205 of FIG. 2, is propagated over the network and applied to a local scene tree experienced by a second user in accordance with an embodiment of the present invention. In process 501 of FIG. 5, the Local Visual Editor 205 of FIG. 2 receives a change declaration from a Network User 209 via the Editor Listener 213 over the network. In process 503, the Visual Editor 205 automatically requests the declaration processor 103 to mirror this change. In process 505, the declaration processor 103, via the Scene Tree Manager 107, then applies this change to the instantiated scene tree 109.

Figure 6:
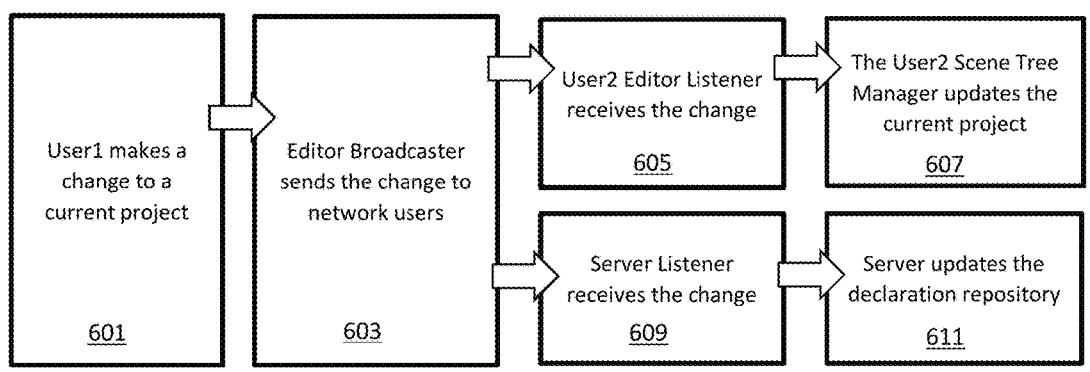
FIG. 6 is a flow diagram showing logical processes by which any change made in any declaration by any user on the network to any scene accessible over the network is synchronized with other users on the network and with a declaration repository residing on a server system in accordance with an embodiment of the present invention.

FIG. 6 is a flow diagram showing logical processes by which any change made in any declaration by any user on the network to any scene accessible over the network is synchronized with other users on the network and with a declaration repository residing on a server system in accordance with an embodiment of the present invention. In process 601 of FIG. 6, User 1 makes a change to the current project, for example, using Visual Editor 205 of FIG. 2. In process 603, this change is sent by the Editor Broadcaster 217 of FIG. 2 to the network users 209. The change sent by the Editor Broadcaster 217 is received in two different contexts. The first context is that of the visual editors of other users; thus, in process 605, an Editor Listener of User 2, similar to Editor Listener 213 of FIG. 2, receives the change, and, in process 607, communicates with the scene tree manager of User 2 to update the current project to reflect the change. The second context is that of the server. (We discuss the structure of the server in connection with FIGS. 7 and 12 below.) In process 609 of FIG. 6, the Server Listener picks up the change broadcast by User1 in process 601. In process 611, the Server Listener then records the change by storing it (in the declaration repository 701 of FIG. 7) as part of a master project log.

Figure 7:
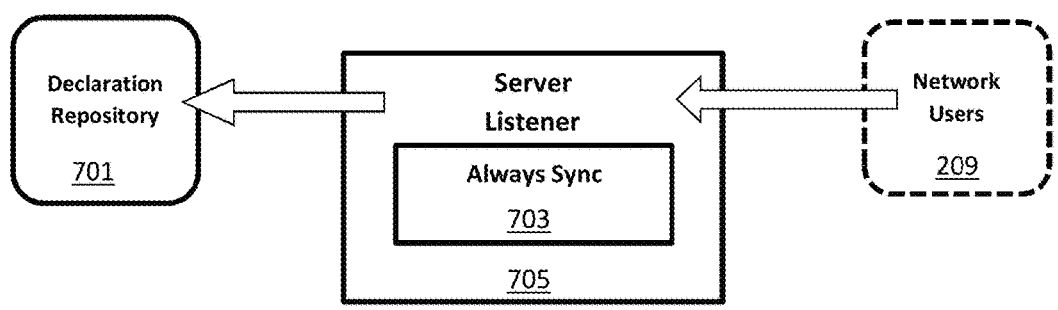
FIG. 7 is a block diagram of an embodiment of the present invention, showing how the server participates as a listener in a multiuser environment in a manner whereby the declaration repository associated with the server is updated with each change made in any declaration by any user on the network to any scene tree accessible over the network.

FIG. 7 is a block diagram of an embodiment of the present invention, showing how the server participates as a listener in a multiuser environment in a manner whereby a declaration repository associated with the server is updated with each change made in any declaration by any user on the network to any scene tree accessible over the network. In FIG. 7. the declaration repository 701 is a master project log residing on a server which is also running a Server Listener 705. The Server Listener 705 contains an Always Sync process 703, which works (i) to receive any incoming change declarations from Network Users 209 of FIG. 2, (ii) to resolve any conflicts, and (iii) to commit these change declarations to the declaration repository 701. The declaration repository 701, in turn, can be used to load the project, to audit changes, and to supply an update to users who have been offline.

Figure 8:
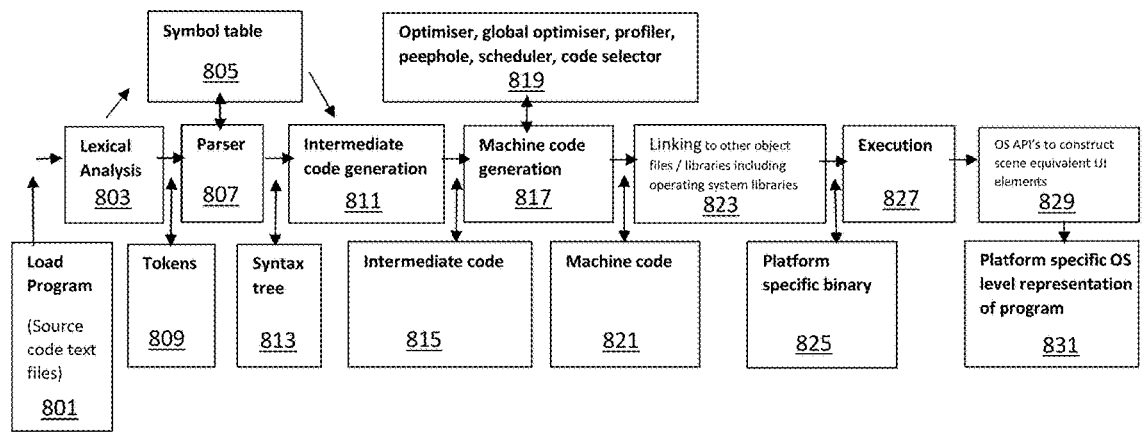
FIG. 8 is a block diagram showing logical processes carried out to compile and execute a computer program in a typical prior art computer environment.

FIG. 8 is a block diagram showing logical processes carried out to compile and execute a computer program in a typical prior art computer environment. In FIG. 8, these processes are exemplary, as there are many types of traditional compiler and virtual machine designs. The typical prior art shares a common thread, however, which involves two steps: (1) compiling and (2) executing. Broadly, compiling is the process of converting textual code into a lower level tree of instructions, optimization and linking to external functions. Then the finalized instructions are exported to a platform specific binary or executed directly inside a virtual machine.

In FIG. 8, in process 801, a textual representation of a computer program is loaded into a computer. In process 803, the program is then lexically analyzed and in processes 809 and 805 respectively, tokens and symbol table are extracted. In process 807, the parser uses the Symbol Table to build a Syntax Tree 813, which is a hierarchical representation of the elements of the code in the textual program provided as an input. The Syntax Tree 813 is then put through an Intermediate code generation process 811 to generate the Intermediate code instructions 815 describing the program. The intermediate code instructions are in a format suitable for being operated on for platform translation, a virtual machine or an optimizing compiler. In process 817, the intermediate code is used for generating machine code and in process 819 the machine code is subject to instruction level optimization to provide machine specific instruction code 821. This code is linked to other libraries in process 823 to provide a platform specific binary 825 built as the final executable. Then, when the platform specific binary is executed in process 827, the operating system API's are used to requisition GUI and other resources in process 829 to deliver a platform specific operating system and machine instruction version of the program.

Figure 9:
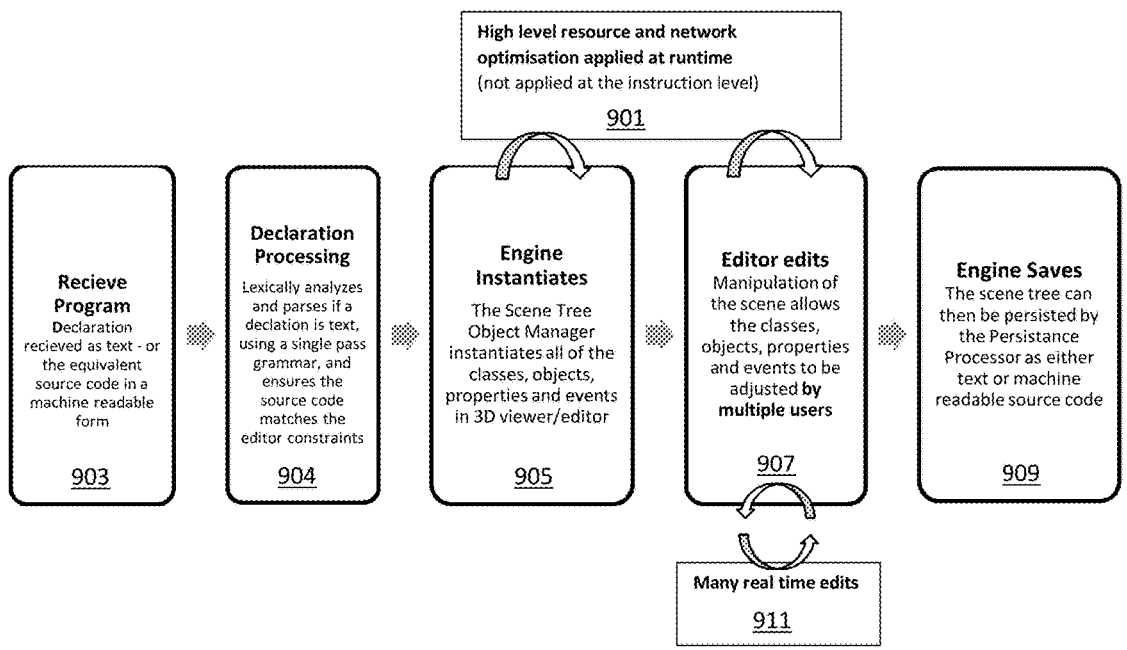
FIG. 9 is a block diagram showing logical processes carried out to create and execute a computer program in a computer environment in accordance with an embodiment of the present invention.

FIG. 9 is a block diagram showing logical processes carried out to create and execute a computer program in a computer environment in accordance with an embodiment of the present invention. Embodiments of the present invention utilize simulation of a computer program in a manner that is very different from the normal processes described in connection with FIG. 8. Whereas in the prior art, as discussed in connection with FIG. 8, execution is essential for a normal program to operate on a computer, embodiments of the present invention provide for operation on a computer via a novel simulation mode. In these embodiments, foundational software is first compiled and executed in the normal manner for a specific machine instruction set and operating system and associated API's. This foundational software establishes the application system 201 described in connection with FIG. 2.

After the application system 201 is loaded into a computer, the processes of FIG. 9 can be carried out. In process 903, the user's program, in the form of a declaration or source code in machine readable form corresponding to a declaration, is received by the application system 201. In process 904, the loaded declaration is lexically analyzed and parsed by the declaration processor (item 103 in FIG. 1) and turned into a Declared Scene Tree of Objects (item 105 of FIG. 1).

The declaration syntax and language constructs are intentionally constrained to make declaration processing, in process 904, rapid and efficient. Specifically, declarations are required to adhere to the following rules of grammar:
(1) a loop is not permitted;
(2) a branching condition is not permitted;
(3) a procedure with a set of parameters is permitted (including a procedure call to a procedural function in a scripting language suitably registered with a procedural contract); and
(4) an object in a declared scene tree is permitted to have a set of states, wherein:
each state must be separately selected from a group consisting of (a) a state that is a set of nested states and (b) a state that is nonoverlapping with any other state; and each state can encompass a set of properties, a set of events, and a set of sub-objects; and
a given state can only be active or inactive; and
active states in a declaration are applied, by the scene tree manager, in the order in which they are declared.

The effect of these rules is that when in process 905 the scene tree object manager 107 of FIG. 2 instantiates the objects defined by the declaration to create a final Instantiated Scene Tree of Objects 109, it forms a simple directed acyclic graph. This property allows the Visual Editor 205, in process 907 to edit the live Scene Tree, and, in process 911, for many real time editors to participate. This approach of keeping a live model of the running application as a graph allows for multi user editing and high level optimizations to be applied, because, in process 901, the program is simulated. Finally, in process 909, the persistence processor can be used to save the current live state of the Instantiated Scene Tree of Objects 109. The optimization process 901 is able to perform a huge number of optimizations such as resource caching, pre-caching, level of detail, lazy evaluation, computation caching and occlusion testing. Various embodiments herein provide a visual scene tree and a goal-directed model in the simulation, so the running program explicitly knows the current and near future goals and can avoid typical processing overhead associated with the prior art—while still ensuring any contracts are completed on time using the Frame Processor 221.

Figure 10:
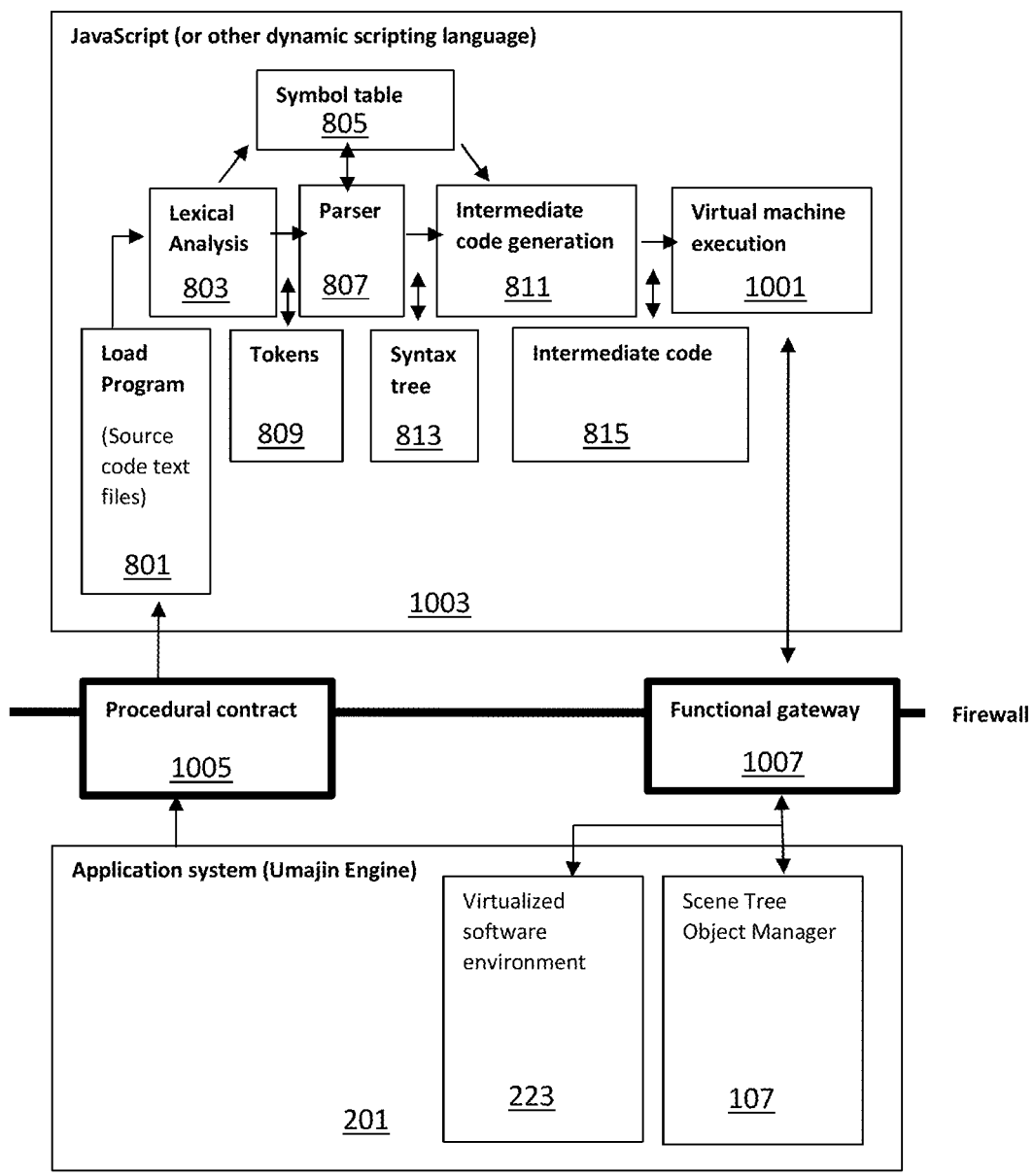
FIG. 10 is a block diagram showing logical processes carried out in an embodiment of the present invention to provide a language extension, using instructions in a format going beyond a declaration, by invoking a dynamic scripting language through a fire-walled environment via a procedural call.

FIG. 10 is a block diagram showing logical processes carried out in an embodiment of the present invention to provide a language extension, using instructions in a format going beyond a declaration, by invoking a dynamic scripting language through a fire-walled environment via a procedural call. In the embodiment of FIG. 10, there is employed a loosely coupled procedural contract 1005 to allow a traditional compiled or just in time compiled language (Javascript in this example), to be used as an extension of the declaration grammar described in connection with FIG. 9. The procedural contract 1005 accesses the JavaScript or other compiled or scripted function, in box 1003, that has the features discussed above in connection with FIG. 8, which are shown as components of box 1003. This embodiment allows developers to write new JavaScript functions and expose them as a visual linear action in a manner consistent with the declaration grammar. The procedural contract is an agreement on the name of the function, its parameters and their types, and any callback events which may be required to handle the output or errors that may occur. These events are bubbled back into the declaration processing as normal actions. The benefit for this embodiment is that when Javascript is packaged as a procedural contract, the resultant action still meets the restricted syntactical and structural definitions of the FIG. 9 embodiment while allowing developers to write arbitrarily complex external code.

The second half of the challenge posed in this embodiment is to enable these JavaScript programs to do anything of consequence via the application system 201 of FIG. 2. This functionality is made possible through the Functional Gateway 1007 of FIG. 10. The Functional Gateway 1007 allows the JavaScript programmer to safely and asynchronously access the operating system and hardware via the Virtualized Software Environment 223. The Functional Gateway 1007 lets the Javascript programmer play sounds, access the network or other API's via a generic cross-platform API. The Functional Gateway 1007 also lets the Javascript programmer safely and asynchronously access the running application objects and make changes using the Scene Tree Object Manager 107.

Figure 11:
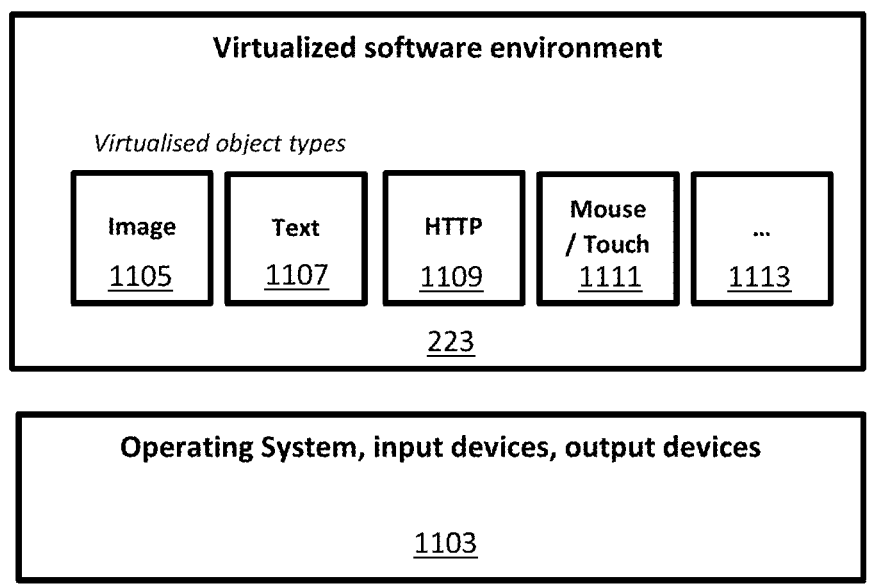
FIG. 11 is block diagram showing software components of the virtualized software environment, used in an embodiment of the present invention, that resides in the application system.

FIG. 11 is block diagram showing software components of the virtualized software environment 223, used in an embodiment of the present invention that resides in the application system of FIG. 2. The Virtualized Software Environment 223 sits on top of the specific combination of device hardware, operating system, input devices and output devices 1103. The goal is to virtualize and generalize the computing environment which may be client or server devices. This means for client environments the traditional operating system GUI elements are not used and a 3D rendered surface is provided instead. As a result the environment created by this embodiment has the ability to make quite different systems look more similar. There are many different types of objects in the Virtualized Software Environment and the present embodiments are specifically designed to allow these objects (indicated generically as item 1113) to be quickly extended as new capabilities are released by device and OS manufacturers. Some examples of virtualized object types include loading and displaying Images 1105, Rendering and allowing input for Text 1107, HTTP network protocols 1109, Mouse/Touch 1111.

Figure 12:
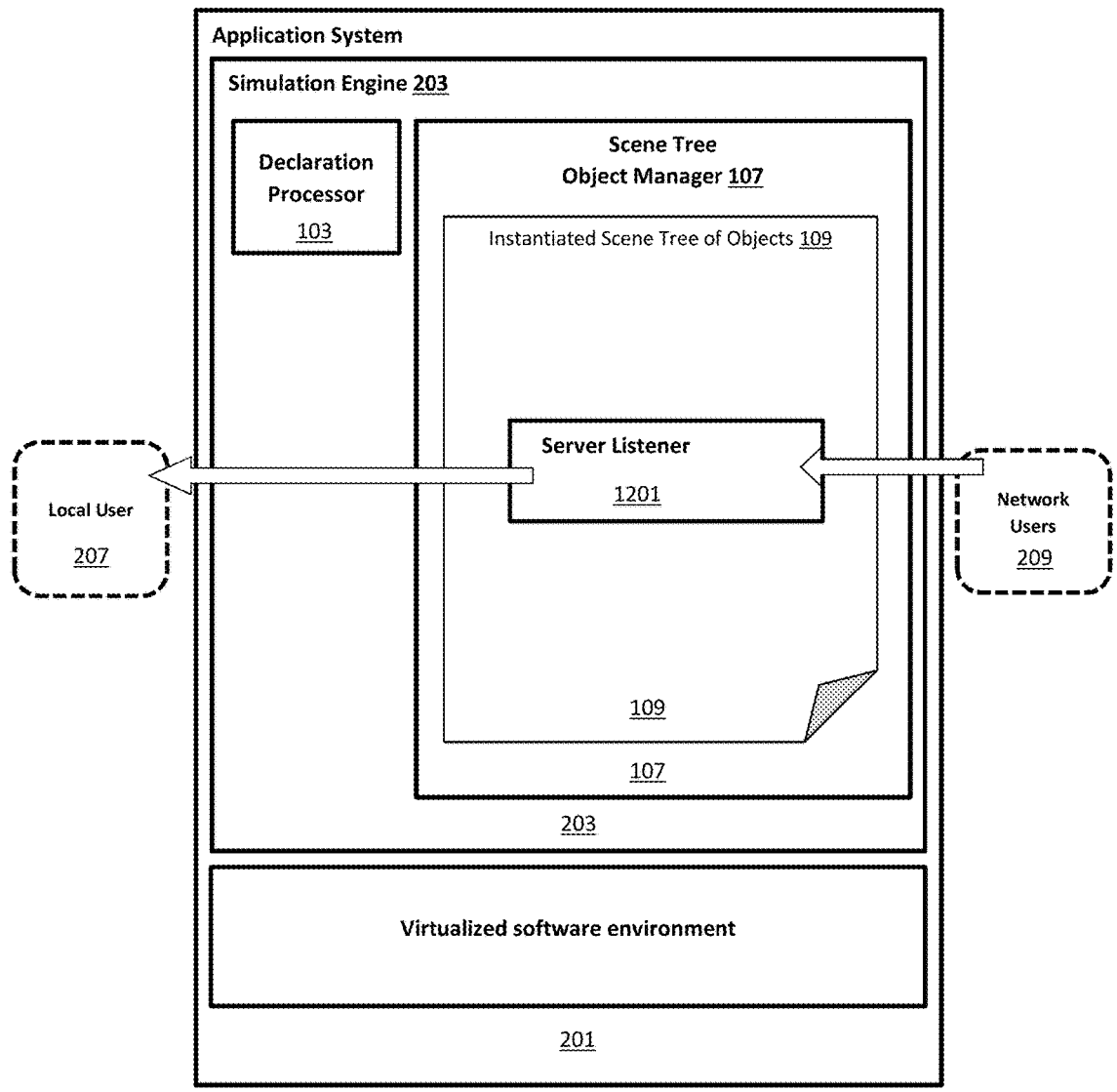
FIG. 12 is block diagram of an embodiment of the present invention, in which an application system in a multiuser environment contains a simulation engine that, in turn, contains a scene tree object manager that is hosting, in this example, declarations establishing functionality of a server system.

FIG. 12 is block diagram of an embodiment of the present invention, in which an application system in a multiuser environment contains a simulation engine that, in turn, contains a scene tree object manager that is hosting, in this example, declarations establishing functionality of a server system. The block diagram of the server system is much simpler than the visual editor in FIG. 2 as it excludes the visual elements. In this case the Virtualized Software Environment 223 and FIG. 11 would also be quite different as the objects would be non-visual and server-specific. The Application System 201 for the server further contains a Simulation Engine 203 with a Server Listener 1201 receiving new project updates from Network Users 209 to the Instantiated Scene Tree of Objects 109 processed by the Declaration Processor 103 and applied by the Scene Tree Object Manager 107.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), pre-loaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

While the invention has been particularly shown and described with reference to specific embodiments, it will be understood by those skilled in the art that various changes in form and detail may be made therein without departing from the spirit and scope of the invention as defined by the appended clauses. While some of these embodiments have been described in the claims by process steps, an apparatus comprising a computer with associated display capable of executing the process steps in the claims below is also included in the present invention. Likewise, a computer program product including computer executable instructions for executing the process steps in the claims below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A nontransitory storage medium encoded with instructions, for use with a plurality of computer systems, each one of which is in communication in real time over a network with other computer systems of the plurality of computer systems, wherein the instructions, when executed on each of the computer systems, establish, on each computer system, an application system, wherein the application system includes a simulation engine and a virtualized software environment, the simulation engine running on top of the virtualized software environment and enabling creation and editing of a project by a local user and network users, wherein the simulation engine comprises:

a declaration processor that linearly processes a first declaration that constitutes a text embodiment of the project, reciting any set of items selected from the group consisting of object, relationship, property, behavior, and combinations thereof, into a declared scene tree of objects;

a scene tree object manager that (a) manages objects, their relationships, properties, and behaviors in the declared scene tree of objects, (b) causes transformation of the declared scene tree of objects so as to be mirrored in a project subnode of an instantiated scene tree of objects, the project subnode constituting an instantiated embodiment of the project, and (c) causes updating of the instantiated scene tree when it is changed;

a persistence processor in communication with the scene tree object manager, that causes mirroring, of the instantiated scene tree of objects, in a second declaration;

a visual editor, the visual editor being a subnode of the instantiated scene tree, that makes user-directed changes to the project subnode of the instantiated scene tree, wherein the project subnode is a subnode of the visual editor;

an editor broadcaster, the editor broadcaster being a subnode of the instantiated scene tree, coupled to the network, that obtains changes from the visual editor and causes the persistence processor to transform a correspondingly changed part of the instantiated scene tree into a change declaration and broadcasts the change declaration embedded in a change message over the network to the other computer systems; and an editor listener, the editor listener being a subnode of the instantiated scene tree, coupled to the network, that receives and processes any change message, from any other of the computer systems, by causing the declaration processor to transform a declaration embedded in received change message into a corresponding change in the instantiated scene tree;

a rendering processor, coupled to the virtualized software environment, to requisition hardware resources to cause physical manifestation of the instantiated scene tree of objects in a form selected from the group consisting of audio, visual, network communication, storage in a transitory or a nontransitory basis, computational tasks, and combinations thereof, the physical manifestation being optimized by evaluation of hardware resources that are both available and required to be allocated in order to achieve the physical manifestation.

2. A storage medium according to claim 1, wherein the editor has a mode wherein it operates solely as a viewer and does not communicate with the editor broadcaster or the persistence processor.

3. A storage medium according to claim 1, wherein the visual editor maintains a globally unique identifier for each object in the instantiated scene tree, so that each change, made over the network, can use the identifier to reference the corresponding object and that such change can be correctly applied to the instantiated scene tree.

4. A storage medium according to claim 1, wherein the visual editor associates, with each change made by a user over the network, an identification of the user making the change and a time stamp.

5. A storage medium according to claim 1, wherein the visual editor characterizes each change, made over the network, to the instantiated scene tree, as a member of the group consisting of insertion, deletion, update, lock, unlock, and combinations thereof.

6. A storage medium according to claim 1, wherein each of the computer systems is coupled over the network to a server system, and the editor broadcaster also broadcasts the change declaration embedded in the change message over the network to the server system for storage thereof in a declaration repository.

7. A storage medium according to claim 1, wherein the simulation engine further comprises:
 a frame clock defining consecutive frames of the engine with respect to which operations are synchronized.

8. A storage medium according to claim 1, wherein the simulation engine further comprises:
 a frame processor, coupled to the virtualized software environment and to the simulation engine, to require the simulation engine to perform operations, specified with respect to a sequence of frames using the frame clock, to assure that the processes are performed sequentially.

9. A storage medium according to claim 8, wherein (a) the simulation engine further comprises a frame queue, filled by the simulation engine, in which are stored, in frame order, software contracts pertinent to processes to be carried out by the simulation engine, and (b) the frame processor is coupled to the frame queue and, if a specific software contract in the frame queue reaches a current frame for performance, the frame processor enforces the terms of the specific software contract as to best efforts and guaranteed terms.

10. A storage medium according to claim 9, wherein the frame processor is configured to process, concurrently with the current frame, a set of frames sequenced after the current frame, with respect to demand expected to be placed on system resources by the specific software contract, so as to enhance efficiency of execution of the contract when each frame in the set of frames shall have become the current frame.

11. A storage medium according to claim 10, wherein, in the processing of an event, via the frame processor, from the virtualized software environment, the simulation engine executes logic creating a temporal assignment, which is added to the frame queue at a frame number computed, based on a current frame number and a target time, in frame order by object and property, so that if the computed frame number is less than a frame number of any second item in the frame queue, then the second item will be flushed from the queue.

12. A storage medium according to claim 11, wherein, at the time of creating the temporal assignment the frame processor stores an initial set of values and the initial time along with a target set of values and a target time, and an interpolation function, when a frame needs to be computed, the frame processor computes a set of current values using the current time, the initial time and the target time to drive the interpolation function between the initial values and target values.

13. A storage medium according to claim 12, wherein the frame processor operates on a best efforts basis to cause updating of the interactive scene tree and visual scene tree so as to correspond with the calculated set of values until the final frame has been, at which time the frame processor causes the temporal assignment to be contractually updated throughout the system.

14. A storage medium according to claim 10, wherein, in the processing of an event, via the frame processor, from the virtualized software environment, the simulation engine executes logic creating a temporal procedure, which is added to the frame queue at a frame number computed, based on a current frame number and a target time, in frame order by object and property, so that if the computed frame number is less than a frame number of any second item in the frame queue, then the second item will be flushed from the queue.

15. A storage medium according to claim 1, wherein the first declaration conforms to a declaration grammar wherein:
 a loop is not permitted;
 a branching condition is not permitted;
 a procedure with a set of parameters is permitted; and
 an object in a declared scene tree is permitted to have a set of states, wherein:
  each state must be separately selected from a group consisting of (a) a state that is a set of nested states and (b) a state that is nonoverlapping with any other state; and
  each state can encompass a set of properties, a set of events, and a set of sub-objects; and
  a given state can only be active or inactive; and
  active states in a declaration are applied, by the scene tree manager, in the order in which they are declared.

16. A storage medium according to claim 15, wherein the permitted procedure with the set of parameters includes a procedure call to a procedural function in a scripting language.

17. A nontransitory storage medium according to claim 1, wherein the scene tree is configured to cause the second declaration is to replace the first declaration.

18. A nontransitory storage medium according to claim 1, wherein the simulation engine includes a library of classes that implement an abstraction of a set of operating systems.

19. A nontransitory storage medium according to claim 1, wherein the editor listener of any given client includes an off-line synchronizer coupled to a repository server system, the repository server system having a declaration repository that stores a log of each change made in any declaration by any user on the network to any scene tree accessible over the network, so that, when the given client comes online after having been offline, the off-line synchronizer communicates with the declaration repository to synchronize changes that were not synchronized when the given client had been offline.

20. A nontransitory storage medium encoded with replicating instructions, for use on a computer configured as a replicating computer in the plurality of computer systems of claim 1, the replicating instructions, when executed on the replicating computer, establish, on the replicating computer, a replicating application system, wherein the replicating application system includes a replicating simulation engine and a replicating virtualized software environment, the replicating simulation engine running on top of the replicating virtualized software environment, wherein the replicating simulation engine comprises:
- a replicator declaration processor that linearly processes a first declaration that constitutes a text embodiment of the project, reciting any set of items selected from the group consisting of object, relationship, property, behavior, and combinations thereof, into a declared scene tree of objects;
- a replicator scene tree object manager that (a) manages objects, their relationships, properties, and behaviors in a declared scene tree of objects, (b) causes transformation of the declared scene tree of objects so as to be mirrored in a project subnode of an instantiated scene tree of objects, the project subnode constituting an instantiated embodiment of the project, and (c) causes updating of the instantiated scene tree when it is changed;
- a replicator editor, that makes user-directed changes to the project subnode of the instantiated scene tree, wherein the project subnode is a subnode of the visual editor; and
- a replicator listener, coupled to the network, that receives and processes any change message, from any other of the computer systems, by causing the declaration processor to transform a declaration embedded in received change message into a corresponding change in the instantiated scene tree.

* * * * *